United States Patent
Perera et al.

(10) Patent No.: US 9,014,269 B2
(45) Date of Patent: Apr. 21, 2015

(54) METHOD AND APPARATUS FOR MANAGING BIT RATE

(75) Inventors: Jane Perera, Saratoga, CA (US); Joseph D. Young, Mountain View, CA (US)

(73) Assignee: General Instrument Corporation, Horsham, PA (US)

( * ) Notice: Subject to any disclaimer, the term of this patent is extended or adjusted under 35 U.S.C. 154(b) by 287 days.

(21) Appl. No.: 12/895,104

(22) Filed: Sep. 30, 2010

(65) Prior Publication Data

US 2012/0082227 A1    Apr. 5, 2012

(51) Int. Cl.
| | | |
|---|---|---|
| H04N 7/26 | (2006.01) |
| H04N 7/24 | (2011.01) |
| H04N 21/2365 | (2011.01) |
| H04N 21/434 | (2011.01) |
| H04N 19/105 | (2014.01) |
| H04N 19/503 | (2014.01) |
| H04N 19/147 | (2014.01) |
| H04N 19/15 | (2014.01) |
| H04N 19/61 | (2014.01) |
| H04N 19/107 | (2014.01) |
| H04N 19/157 | (2014.01) |

(Continued)

(52) U.S. Cl.
CPC ....... H04N 21/2365 (2013.01); H04N 21/4347 (2013.01); H04N 19/105 (2014.11); H04N 19/503 (2014.11); H04N 19/147 (2014.11); H04N 19/15 (2014.11); H04N 19/61 (2014.11); H04N 19/107 (2014.11); H04N 19/157 (2014.11); H04N 19/174 (2014.11); H04N 19/527 (2014.11); H04N 19/567 (2014.11); H04N 19/40 (2014.11)

(58) Field of Classification Search
CPC .......... H04N 21/2365; H04N 21/4347; H04N 21/4312
USPC ......................................................... 375/240
See application file for complete search history.

(56) References Cited

U.S. PATENT DOCUMENTS

| | | | |
|---|---|---|---|
| 5,594,507 A | 1/1997 | Hoarty | |
| 6,373,530 B1 * | 4/2002 | Birks et al. | 348/584 |

(Continued)

FOREIGN PATENT DOCUMENTS

| | | |
|---|---|---|
| KR | 2002-0042822 | 6/2002 |
| WO | 01/19090 A1 | 3/2001 |
| WO | WO 0119090 A1 * | 3/2001 |

OTHER PUBLICATIONS

Di Xu et al, "Logo insertion transcoding for H.264 AVC compressed video", Nov. 7, 2009, International Conference On, IEEE pp. 3693-3696.*

(Continued)

*Primary Examiner* — Christopher S Kelley
*Assistant Examiner* — Deirdre Beasley
(74) *Attorney, Agent, or Firm* — Lori Anne D. Swanson (57) ABSTRACT

A crawl motion vector is determined based on a speed and direction of the crawling text to be displayed in a text crawl area. A determination whether to re-encode macroblocks in the plurality of pictures is made. The macroblocks in the plurality of pictures that are to be re-encoded are either macroblocks having motion vectors pointing to the text crawl area or macroblocks within the text crawl area. A lowest bit rate coding option for each macroblock to be re-encoded is determined, and each macroblock is re-encoded using the lowest bit rate coding option for the macroblock.

18 Claims, 7 Drawing Sheets

(51) Int. Cl.
*H04N 19/174* (2014.01)
*H04N 19/527* (2014.01)
*H04N 19/567* (2014.01)
*H04N 19/40* (2014.01)

(56) References Cited

U.S. PATENT DOCUMENTS

| | | | |
|---|---|---|---|
| 6,573,945 | B1 | 6/2003 | Wu et al. |
| 6,621,866 | B1 * | 9/2003 | Florencio et al. ........ 375/240.25 |
| 6,658,057 | B1 | 12/2003 | Chen et al. |
| 7,012,963 | B2 * | 3/2006 | Zdepski et al. .......... 375/240.27 |
| 7,647,620 | B2 | 1/2010 | Van Der Meer et al. |
| 8,155,202 | B2 * | 4/2012 | Landau .................... 375/240.16 |
| 2002/0067768 | A1 * | 6/2002 | Hurst ....................... 375/240.03 |
| 2006/0170824 | A1 * | 8/2006 | Johnson et al. ................ 348/569 |
| 2008/0170619 | A1 | 7/2008 | Landau |
| 2009/0016618 | A1 * | 1/2009 | Zhou ............................. 382/232 |
| 2009/0213935 | A1 * | 8/2009 | van der Laan et al. .. 375/240.16 |
| 2009/0232221 | A1 * | 9/2009 | Cheng et al. ............ 375/240.24 |

OTHER PUBLICATIONS

PCT Search Report & Written Opinion, Re: Application #PCT/US2011/049699; Nov. 9, 2011.

Di Xu, et al, "Logo insertion transcoding for H.264/AVC compressed video", Image Processing (ICIP) 2009 16th IEEE International Conference on; Nov. 7, 2009; pp. 3693-3696.

Xiao S, et al, "Low-cost and efficient logo insertion scheme in MPEG video transcoding", Visual Communications and Image Processing; Jan. 21-23, 2002.

Chih-Hung Li, et al, "A multiple-window video embedding transcoder based on H.264/AVC standard", Eurasip Journal on Advances in Signal Processing, vol. 2007, No. 13790; Jan. 1, 2007; pp. 1-17.

Office Action Re: Korean Application #10-2013-7008244 (foreign text and English translation), dated Feb. 27, 2014.

Office Action Issued to Korean Application No. 10-2013-7008244 on Sep. 30, 2014.

* cited by examiner

METHOD AND APPARATUS FOR MANAGING BIT RATE

BACKGROUND

Crawling text is text that is shown as overlayed on a program or other content being viewed. The crawling text typically provides secondary information to viewers of a primary program. The secondary information may include weather alerts, advertisements, breaking news, etc. The crawling text is known to cross a designated area of a picture in a predetermined direction, for example, the bottom of a television screen from left to right.

Crawling text may be blended with a video bit stream provided to an end user. In these situations, motion vectors from the original coded video that point into the designated area where the crawling text is inserted, and motion vectors within the text area are often inappropriate and inefficient. The motion vectors are known to be inappropriate and inefficient because the content that they refer to within the crawling text area has changed. For example, when the original motion vectors of a macroblock X are chosen, the area in the reference frame that the original motion vectors pointed into was part of the original unblended video that had a reference area that closely matched macroblock X. After the crawling text is inserted, the original motion vectors point into the same area, but the content has changed and no longer closely matches macroblock X. When the new reference area is used, the differences between macroblock X and the new reference area are much larger than the differences between the original reference area and macroblock X. The number of bits needed to code these larger differences is larger than would be needed if a good match was found and is therefore inefficient. In the area where the text is inserted, the content is changed and so the values of the original macroblock motion vectors are no offer an efficient coding option.

SUMMARY

Disclosed herein is a method for managing bit rate for a video bit stream having a plurality of pictures, according to an embodiment. In the method, a crawl motion vector is determined based on a speed and direction of the crawling text to be displayed in a text crawl area. A determination whether to re-encode macroblocks in the plurality of pictures is made. The macroblocks in the plurality of pictures that are to be re-encoded are either macroblocks having motion vectors pointing to the text crawl area or macroblocks within the text crawl area. A lowest bit rate coding option for each macroblock to be re-encoded is determined, and each macroblock is re-encoded using the lowest bit rate coding option for the macroblock.

Also disclosed herein is a text-adding apparatus, according to an embodiment. The text-adding apparatus includes one or more modules configured to determine a crawl motion vector based on a speed and direction of crawling text to be displayed in a text crawl area. The one or more modules determine macroblocks in the plurality of pictures having motion vectors pointing to the text crawl area, and macroblocks in the plurality of pictures that are within the text crawl area. Thereafter, the one or more modules determine a lowest bit rate coding option for each macroblock having a motion vector pointing to the text crawl area and each macroblock within the text crawl area. The one or more modules are also configured to re-encode each macroblock using the lowest bit rate coding option for the macroblock. The text-adding apparatus also includes a processor configured to implement the one or more modules.

Further disclosed is a computer readable storage medium on which is embedded one or more computer programs implementing the above-disclosed method for managing bit rate for a video bit stream having a plurality of pictures, according to an embodiment.

Through implementation of the method and apparatus disclosed herein, the number of intra-coded macroblocks used to encode a video bit stream is reduced and thereby the number of bits in the encoded video bit stream is reduced. Additionally, a lowest bit rate coding option for a motion vector used to encode the video bit stream provides a process for decreasing the bit rate for the video bit stream while ensuring a relatively high quality picture.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention. Furthermore, the embodiments may be used in combination with each other.

Figure 1:
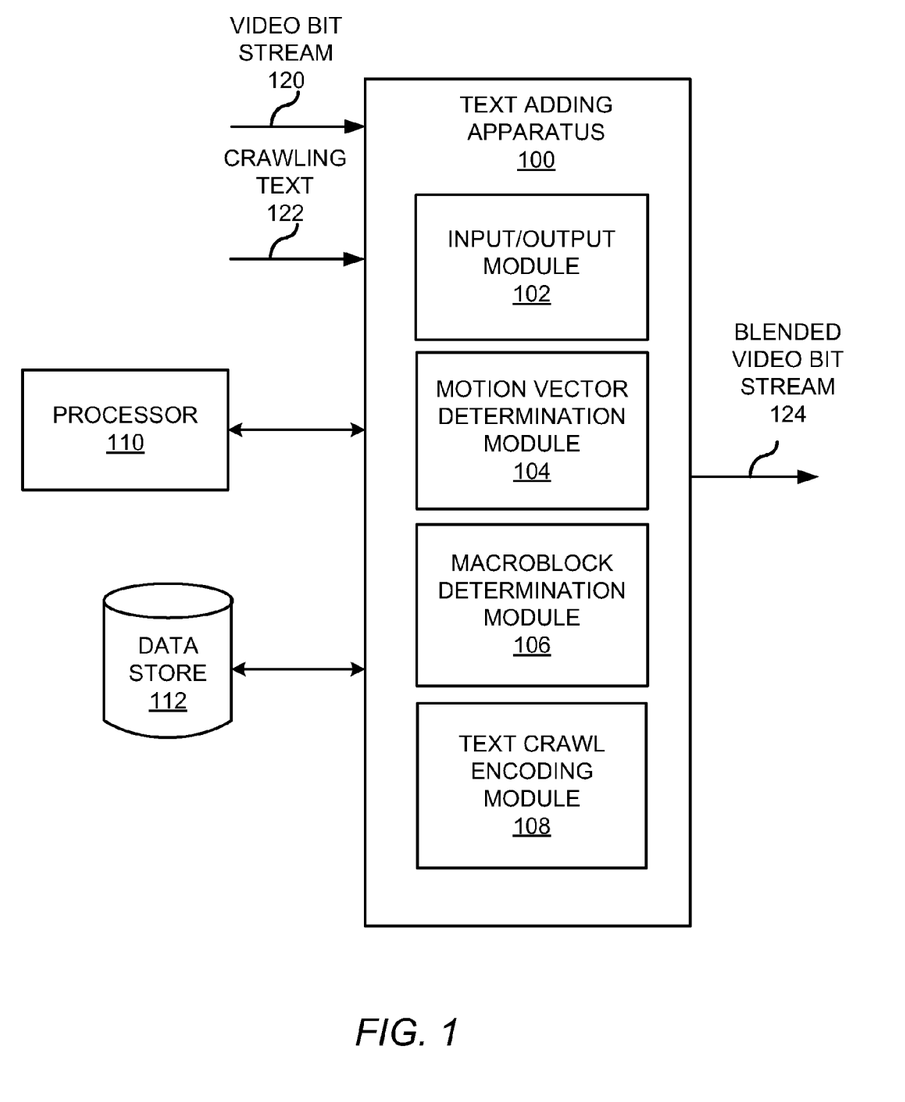
FIG. 1 illustrates a block diagram of a text-adding apparatus, according to an embodiment.

FIG. 1 illustrates a simplified block diagram of a text-adding apparatus 100 configured to insert crawling text 122 into a video bit stream 120 having a plurality of pictures, according to an embodiment. It should be understood that the text-adding apparatus 100 depicted in FIG. 1 may include additional components and that some of the components described herein may be removed and/or modified without departing from a scope of the text-adding apparatus 100.

The text-adding apparatus 100 is depicted as including an input/output module 102, a motion vector determination module 104, a macroblock determination module 106, and a text crawl encoding module 108. The modules 102-108 may comprise software modules, hardware modules, or a combination of software and hardware modules. Thus, in one embodiment, one or more of the modules 102-108 comprise circuit components. In another embodiment, one or more of the modules 102-108 comprise software code stored on a non-transitory computer readable storage medium, which is executable by a processor. As such, in one embodiment, the text-adding apparatus 100 comprises a hardware device. In another embodiment, the text-adding apparatus 100 comprises software stored on a computer readable medium.

Figure 2A:
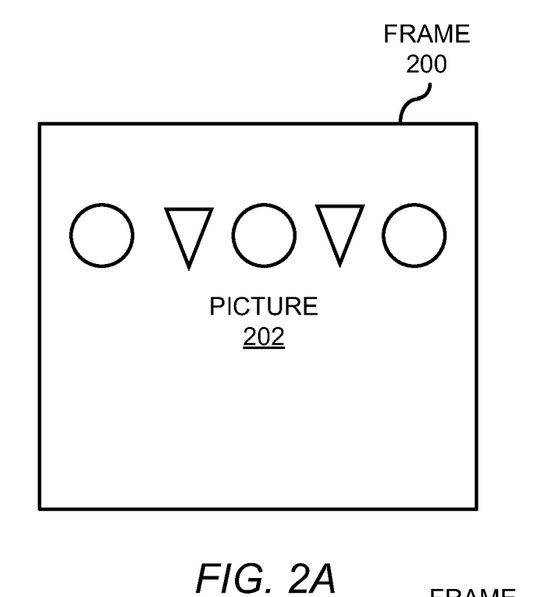
FIGS. 2A and 2B illustrate block diagrams of a picture and a picture with a text crawl area, according to an embodiment.
Figure 2B:
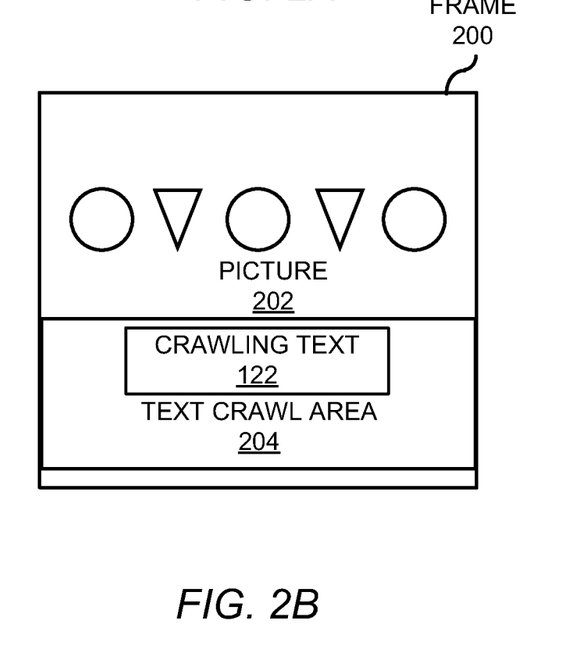

The input/output module 102 is configured to access the video bit stream 120. The video bit stream 120 includes a plurality of pictures. The plurality of pictures are displayed as a picture 202 in a frame 200, shown in FIG. 2A. Each of the plurality of pictures in the video bit stream 120 may be displayed time sequentially (not shown). The video bit stream 120 may comprise streaming video provided to end users from a content provider. For example, the video bit stream 120 may comprise broadcast, satellite or cable content delivered to subscribers or the general public from the content provider. Concurrently, the input/output module 102 may access crawling text 122 to be displayed in a text crawl area 204 as shown in FIG. 2B. For example, the crawling text 122 may comprise sports, weather, traffic, shopping or any such information that the content provider intends to include with the video bit stream 120. The crawling text 122 is configured to move across the text crawl area 204 with a predetermined speed and direction. For instance, the crawling text 122 may move across the text crawl area from right to left. Although the text crawl area 204 is shown as a horizontal portion of the frame 200, the crawling text 122 and the text crawl area 204 may be aligned in different arrangements and the crawling text 122 may move in other directions. The text crawl area 204 may be aligned horizontally as shown in FIG. 2B or vertically (not shown) across the picture 202.

The motion vector determination module 104 is configured to determine a crawl motion vector based on a speed and direction of the crawling text. For instance, the direction may be vertical from top to bottom or horizontal from right to left. Speed may be set as desired. The crawl motion vector is determined from the range and direction of movement in the crawling text box between a current frame and a reference frame. If the current frame is a P frame, the current frame will refer to the previous P or I frame as a reference frame. For example, a group of pictures (GOP) sequence could consist of frames in presentation order: IBBPBBPBBPBB.

The first P frame may have a reference as the previous I frame. In this case, there will be two B frames in between the P and I frames, the motion vectors can be determined from the speed. For instance, using the following equation:

Movement of crawl between $P$ and $I$ frame=(number of pixels crawl moves per frame)×(number of frames between current frame and reference). Eqn (1)

For example, if the crawling text 122 is moving 2 pixels per frame, and for the IP frames there are 3 frames distance, total number of pixels moved between reference frame and current frame is six (2×3=6). Because the motion vectors are stored as half-pel values, the horizontal forward motion vector will be stored with value 12. All other components of this motion vector will be set to zero (vertical component, backward components. second motion vector=0).

According to another example, for the first B frame, this will refer both to the I frame and the future P frame (2 sets). However, the motion vectors referring to the P frame are set to zero, and only the first set referring to the I frame are used to determine the crawl motion vector. In this case, the horizontal motion vector would be four (2×2=4). If the crawling text 122 is moving in a vertical direction, the horizontal components of the crawling text 122 would be zero, and the vertical components would depend on the speed.

The macroblock determination module 106 is configured to determine macroblocks in the plurality of pictures in the video bit stream 120 to be re-encoded. The macroblocks to be re-encoded include macroblocks in the text crawl area 204 and macroblocks having motion vectors pointing to the text crawl area 204. For instance, the macroblock determination module 106 may determine macroblocks in the plurality of pictures in the video bit stream 120 to be re-encoded as described in detail with respect to FIG. 4 and the method 400 hereinbelow.

The text crawl encoding module 108 is configured to insert the crawling text into the video bit stream by re-encoding the text crawl area based on the crawl motion vector and the determined macroblocks in the plurality of pictures having motion vectors pointing to the text crawl area. After the crawling text 122 and the macroblocks pointing to the text crawl area have been re-encoded, the text-adding apparatus 100 may output the blended video bit stream 124 using the input/output module 102.

The processor 110 may comprise a microprocessor, a micro-controller, an application specific integrated circuit (ASIC), and the like. In addition, the modules 102-108 may be configured to access a data store 112 that stores various information that the modules 102-108 may access. The data store 112 may comprise volatile and/or non-volatile memory, such as DRAM, EEPROM, MRAM, phase change RAM (PCRAM), Memristor, flash memory, and the like. In addition, or alternatively, the data store 112 may comprise a device configured to read from and write to a removable media, such as, a floppy disk, a CD-ROM, a DVD-ROM, or other optical or magnetic media.

The text-adding apparatus 100 is configured to use information regarding speed of the crawling text 122 to improve motion estimation and compression efficiency. The text-adding apparatus 100 improves compression by flagging invalidated motion vectors and re-encoding the corresponding macroblocks.

Figure 3:
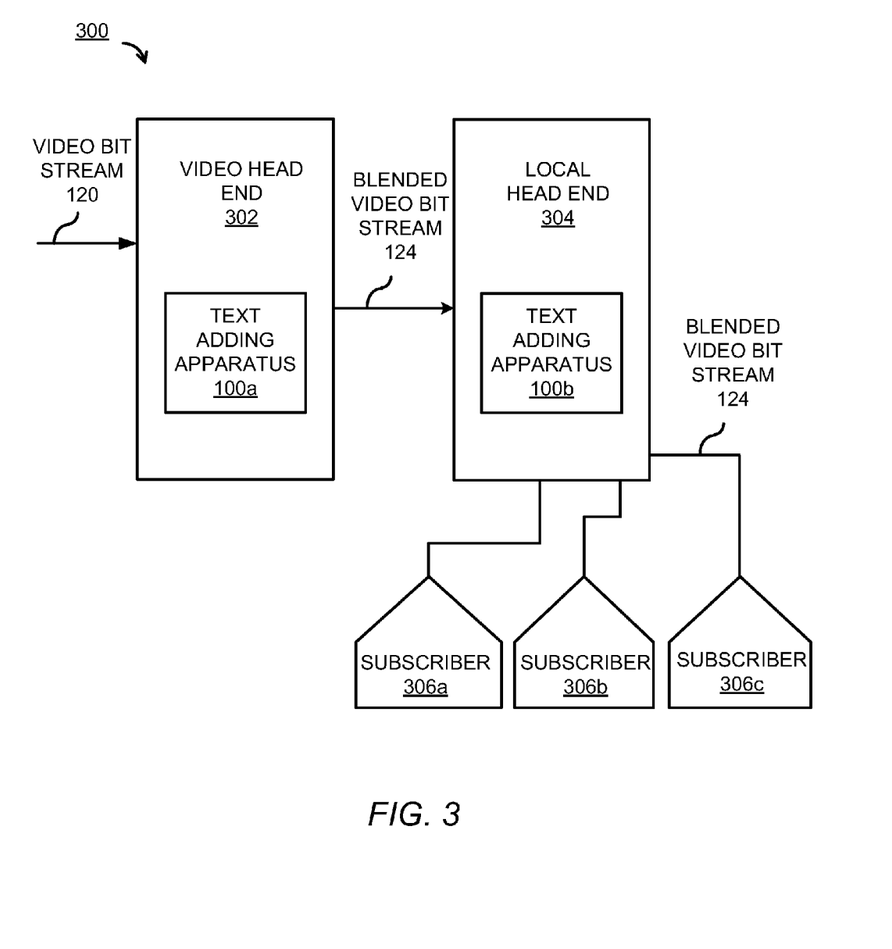
FIG. 3 illustrates a block diagram of a video head end with a text-adding apparatus and local head end with a text-adding apparatus, according to an embodiment.

FIG. 3 illustrates a simplified block diagram of a communication system 300 that may include the text-adding apparatus 100, according to an embodiment. The video head end 302 receives the video stream 120. As shown in FIG. 3, text-adding apparatus 100a may be located at the video head end 302. The text adding apparatus 100a as described hereinabove with respect to FIG. 1 is configured to add crawling text 122 to form a blended video bit stream 124 that is sent to the local head end 304. The blended video bit stream 124 is then sent to subscribers 306a to 306c. Alternately, the crawling text 122 may be added to a video bit stream 120 received from the video head end 302 by text-adding apparatus 100b located at the local head end 304. It should be understood that the communication system 300 depicted in FIG. 3 may include additional components and that some of the components described herein may be removed and/or modified without departing from a scope of the communication system 300.

Figure 4:
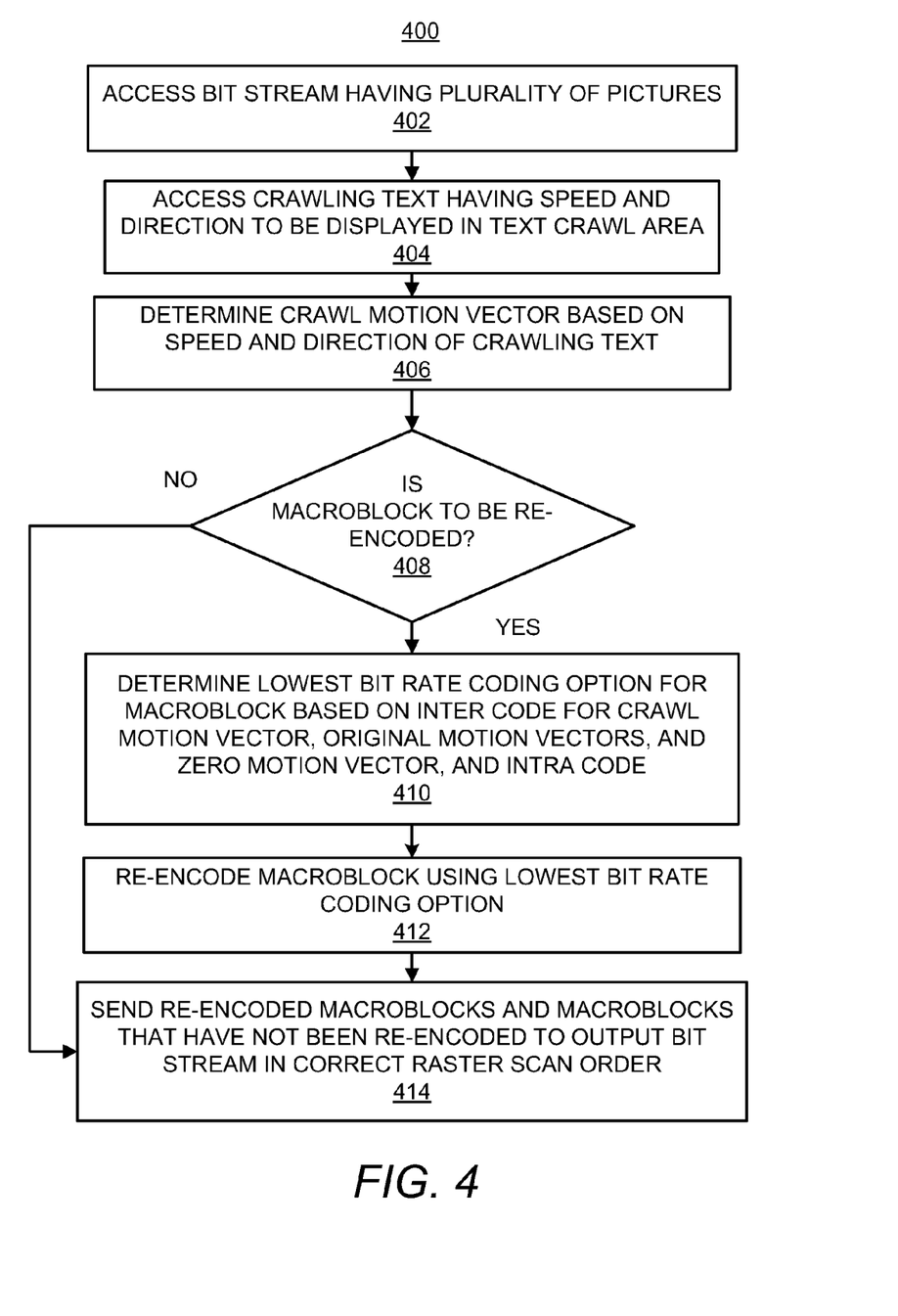
FIG. 4 illustrates a flow diagram of a method of managing bit rate, according to an embodiment.
Figure 5:
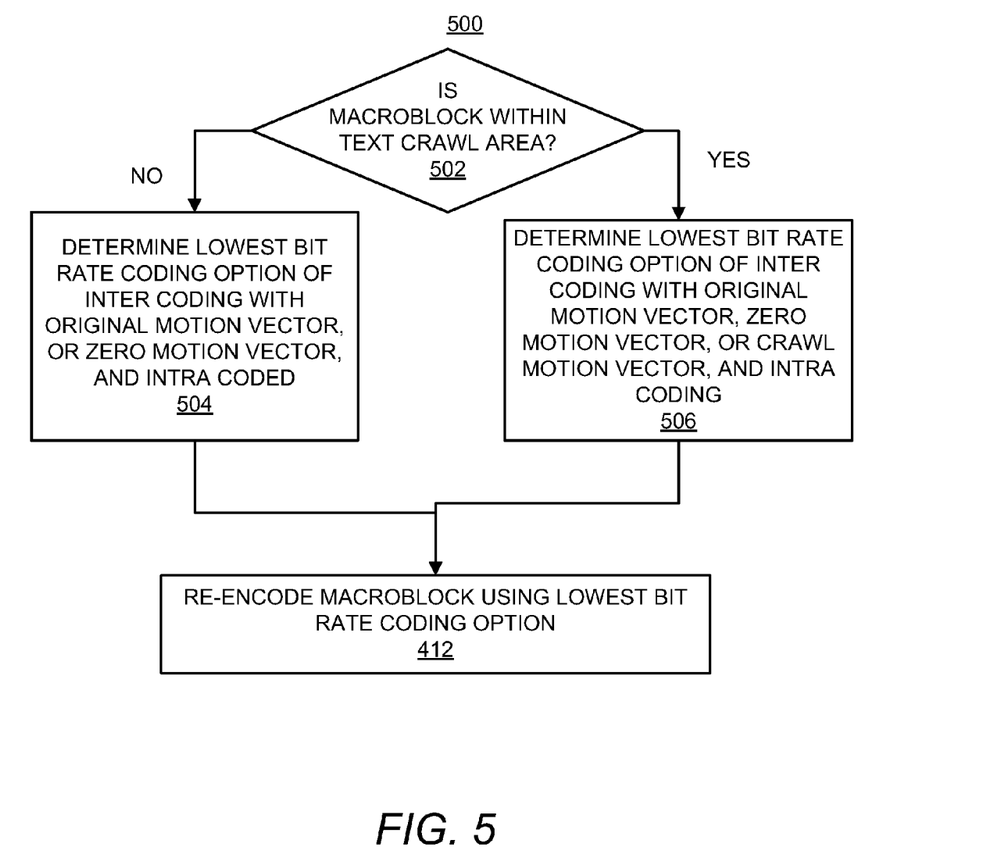
FIG. 5 illustrates a flow diagram of a method of managing bit rate, according to an embodiment.

Examples of methods of operating the text-adding apparatus 100 are now described with respect to the following flow diagrams of the methods 400 and 500 respectively depicted in FIGS. 4 and 5. It should be apparent to those of ordinary skill in the art that the methods 400 and 500 represent generalized illustrations and that other steps may be added or existing steps may be removed, modified or rearranged without departing from the scopes of the methods 400 and 500. In addition, the methods 400 and 500 are described with respect to the text-adding apparatus 100 by way of example and not of limitation, and thus, the methods 400 and 500 may be used in other systems.

Some or all of the operations set forth in the methods 400 and 500 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

With reference first to FIG. 4, at step 402, the video bit stream 120 having the plurality of pictures is accessed, for instance by the input/output module 102 of the text-adding apparatus 100. The input/output module 102 at a head end (not shown) may receive and thereby access the video bit stream 120.

At step 404, the crawling text 122 is accessed, for instance by the input/output module 102. The input/output module 102 may receive and thereby access the crawling text 122. Alternately, the crawling text 122 may be accessed by retrieving the crawling text 122 from a data storage device, for instance the data store 112 in FIG. 1. The crawling text 122 is configured to be displayed in a text crawl area 204. The text crawl area 204 is a predetermined area of the plurality of pictures, for instance as shown in the picture 202 in FIG. 2B. The crawling text 122 has a speed and direction across the text crawl area 204. For instance, the crawling text 122 may move from left to right across the text crawl area 204 that forms a horizontal area of the picture 202.

At step 406, a crawl motion vector is determined based on the speed and direction of the crawling text 122, for instance by the motion vector determination module 104. The crawl motion vector may be determined by receiving a predetermined horizontal and vertical motion vector. Alternately, the motion vector determination module 104 may calculate the crawl motion vector by measuring the speed and direction of the motion vector, and the number of pictures between the current picture being processed and its reference.

Figure 6:
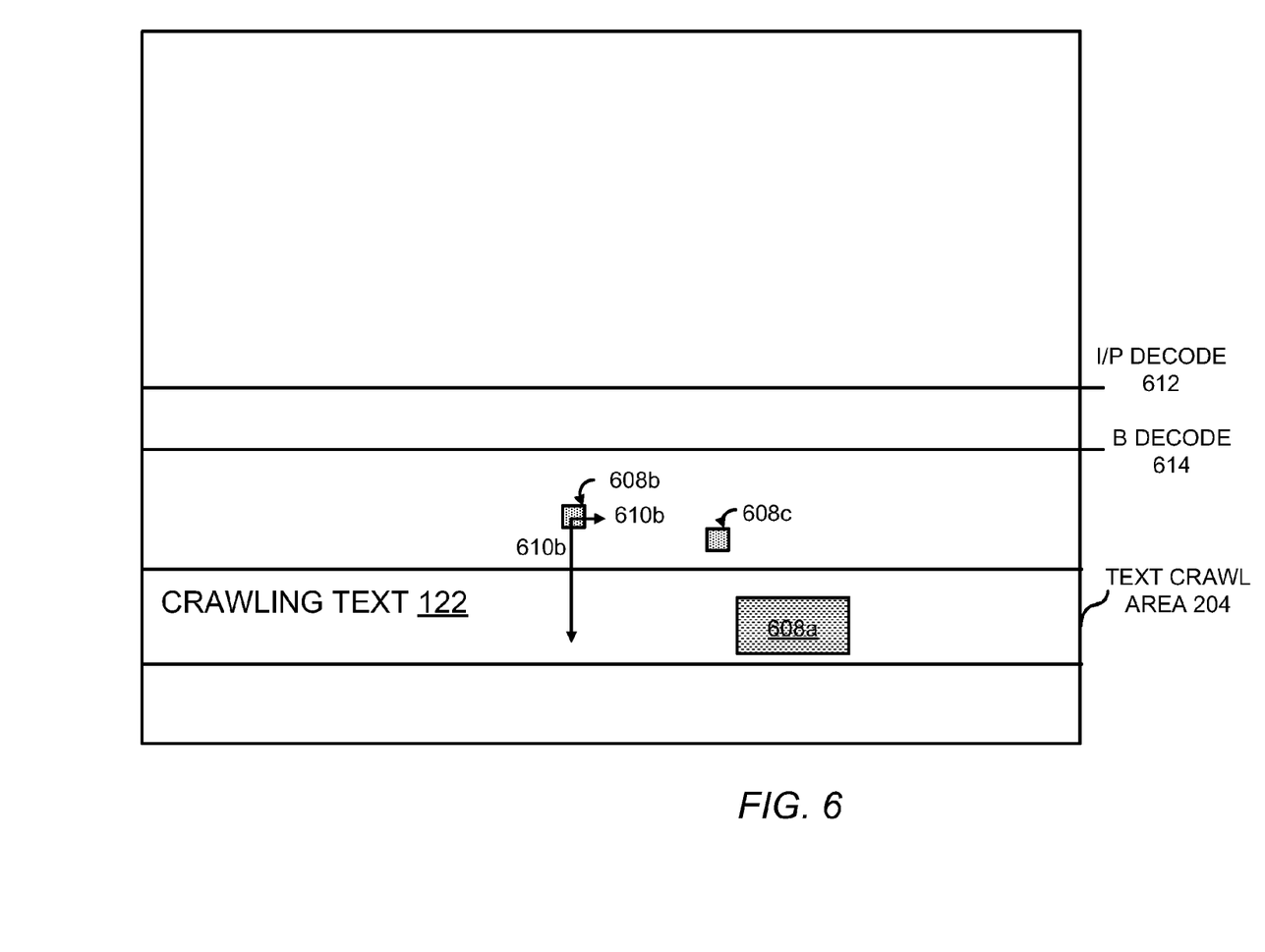
FIG. 6 illustrates a simplified block diagram of motion vectors in a picture, according to an embodiment.

At step 408, a determination as to whether macroblocks are to be re-encoded is made, for instance by the macroblock determination module 106. Each macroblock is to be re-encoded either if the macroblock is a macroblock in the text crawl area 204 or if the macroblock has motion vectors pointing to the text crawl area 204. For instance, as shown in FIG. 6, each of the macroblocks 608a to 608d is checked for motion vectors, 610a to 610d respectively, pointing to the text crawl area 204. Macroblock 608a is located in the text crawl area 204 and is to be re-encoded. Macroblock 608b has a motion vector 610b pointing to the text crawl area 204 and is also to be re-encoded. Macroblock 608c is outside of the text crawl area 204, and does not have a motion vector pointing to the text crawl area 204, and is therefore not to be re-encoded. For each type of frame, whether I, P or B, there is a calculation performed to determine how much of the frame will be decoded and how many rows are candidates for re-encoding. For instance the area from the UP decode 612 line to the text crawl area 204 is to be checked for macroblocks to be re-encoded. Similarly, the area from the B decode 614 line to the bottom of the text crawl area 204 is to be decoded.

For I frames, because there are no motion vectors in I frames, only the area of crawl is re-encoded, but since the I frame can be used as a reference for a subsequent P or B frame, the decoded and blended reference area +/−N rows are decoded, blended and stored as a reference. For example, with respect to MPEG-2, N=16 rows may be selected as a threshold. The area selected for decoding is larger than the text crawl area 204.

For P frames, the area to be decoded is determined in the same way as the I frame. For example, for an MPEG2 coded stream, the area of the picture that needs to be tested for macroblocks that have MVs within the crawl area is determined by looking at the syntax element fcode. This code determines the range of the largest MV in a picture, and how far away from the text crawl area 204 needs to be checked to determine whether the macroblocks have MVs pointing to within the text crawl area 204.

For B frames, the re-encoded and decoded area are the same, since B frames are not used as reference frames. This area is determined by the range of the largest MV.

According to an embodiment, the macroblocks in the plurality of pictures having motion vectors pointing to the text crawl area may be determined by the following process. Slices of macroblocks in the plurality of pictures that are substantially likely to include macroblocks having motion vectors pointing to the text crawl area are determined. The slices of macroblocks may consist of any or all of the picture depending on the compression standard used. For example, the Moving Pictures Expert Group (MPEG) has defined a compression standard MPEG-2 in which each row of macroblocks belongs to a new slice. Additionally, in MPEG-2, each row may have multiple slices. The determined slices of macroblocks in the plurality of pictures that are substantially likely to include macroblocks having motion vectors pointing to the text crawl area are then decoded, for instance by the macroblock determination module 106. Thereafter, a determination whether each macroblock in the decoded slices of macroblocks has a motion vector pointing to the text crawl area 204 is made.

However, at step 408, in response to a determination that the macroblocks are not to be re-encoded, the macroblocks are sent to an output blended video bit stream 124 at step 412. For instance, in reference to the preceding embodiment, a slice of macroblocks in the plurality of pictures may be determined as not substantially likely to include macroblocks having motion vectors pointing to the text crawl area 204 and not including macroblocks in the text crawl area 204. The slice of macroblocks is sent to the output bit stream in a correct raster scan order as shown at step 412 hereinbelow. The correct raster scan order refers to the raster scan order that macroblocks are processed for each picture (left to right, top to bottom). The bits in the bit stream also refer to macroblocks in raster scan order. Slices and macroblocks that are unchanged have their bits concatenated into the bit stream so that the overall bit stream still has all bits in the correct raster scan order. For example, if macroblocks in row 3 positions 3 (R3C3) and 5 (R3C5) are re-encoded due to MVs pointing to the crawl area, the bits from re-encoding R3C3 are concatenated onto a bit stream buffer (not shown). Then, the unchanged bits from MB R3C4 are concatenated onto the bit stream buffer. Finally, the new re-encoded bits from R3C5 are concatenated onto the bit stream buffer as shown at step 412 below.

At step 410, the text crawl area 204 and the determined macroblocks having motion vectors pointing to the text crawl area 204 are re-encoded based on the crawl motion vector and an original motion vector. In the instance of the macroblocks having motion vectors pointing to the text crawl area 204, the original motion vectors are the motion vectors pointing to the text crawl area 204. For instance, a sum of absolute differences (SAD) with regard to relevant motion vectors may be determined for the macroblocks as described in detail with respect to FIG. 5 and the method 500 hereinbelow. A lowest bit rate coding option is thereby selected for the macroblock that reduces the bit rate of the video bit stream 120.

At step 412, the re-encoded macroblocks, for instance the re-encoded macroblocks from step 410 hereinabove, and the macroblocks that have not been re-encoded, for instance the macroblocks determined to not have motion vectors pointing to the text crawl area 204 at step 408 hereinabove, are sent to the blended video bit stream 124 in a correct raster scan order.

Turning now to FIG. 5, there is shown a flow diagram of a method 500 of re-encoding macroblocks having motion vectors pointing to the text crawl area 204 or macroblocks within the text crawl area 204, according to an embodiment. The method 500 may be applied at step 410 of the method 400 hereinabove.

At step 502, a determination whether each macroblock is within the text crawl area is made, for instance by the macroblock determination module 106.

At step 504, in response to a determination at step 502 that a macroblock is not within the text crawl area, a lowest bit rate coding option for the macroblock is determined using an original motion vector that is the motion vector pointing to the text crawl area 204, a zero motion vector, and intra coding. The zero motion vector points to the co-located area in the reference picture. Outside the text crawl area 204, if there is little motion, the co-located area may be a good match. Within the text crawl area, for example in areas of "whitespace" between the text the zero motion vector may also be a good match.

According to an embodiment, the lowest bit rate coding option for the macroblock is determined as follows. A determination whether the macroblock is to be intra-coded or inter-coded with new motion vectors is made. A SAD between the current macroblock and the reference macroblock determined by each set of motion vectors is calculated, and the lowest result indicates the best match and the MVs to be used. If both SADs are too large, according to a predetermined threshold, intra coding is chosen. The crawl motion vector is not tested because the macroblock is not within the text crawl area 204. The sum of absolute differences is a process for finding a correlation between image blocks in which the absolute difference between each pixel in blocks that are being compared is determined. The differences are thereafter summed to determine block similarity.

After the SADs for the motion vectors pointing to the text crawl area 204, and the zero motion vector is tested, a determination is made as to whether both of the SADs for the motion vectors pointing to the text crawl area 204 and the zero motion vector are greater than a predetermined threshold, for instance by the motion vector determination module 104. The predetermined threshold may be a value determined by experimentation to allow for quantization errors. Thereafter, in response to a determination that the SADs for the original motion vector and the zero motion vector are greater than the predetermined threshold, intra coding is selected as the lowest bit rate coding option.

However, in response to a determination that either or both of the SADs for the motion vectors pointing to the text crawl area 204, and the zero motion vector are not greater than the predetermined threshold, a lowest bit rate coding option is selected between the motion vectors pointing to the text crawl area 204, and the zero motion vector. In this instance, the lowest bit rate coding option is inter coding with the lowest bit rate motion vector of the motion vectors pointing to the text crawl area 204, and the zero motion vector. For instance if the lowest bit rate motion vector is the zero motion vector, the zero motion vector is chosen as the candidate with the lowest SAD and the macroblock is inter coded at step 412.

Similarly, in response to a determination of the original macroblock being intra coded, a SAD for the zero motion vector is determined for the macroblock. After the SAD for the zero motion vector is determined, a determination of whether the SAD for the zero motion vector is greater than a predetermined threshold is made, for instance by the motion vector determination module 104. Thereafter, in response to a determination that the SAD for the zero motion vector is greater than the predetermined threshold, intra coding is selected as the lowest bit rate coding option and the macroblock is intra coded at step 412. However, in response to a determination that the SAD for the zero motion vector is not greater than the predetermined threshold, the zero motion vector is selected as the lowest bit rate coding option and the macroblock is inter coded at step 412 using the zero motion vector.

At step 506, in response to a determination at step 502 that a macroblock is within the text crawl area, a lowest bit rate coding option for the macroblock is determined using intra coding or inter coding using the original motion vector, the zero motion vector, the crawl motion vector.

According to an embodiment, the lowest bit rate coding option for the macroblock is determined as follows. A determination whether the original macroblock is intra coded or inter coded is made. Thereafter, in response to the macroblock being inter coded, a SAD between the original motion vector, the crawl motion vector, the zero motion vector, or intra coded is tested. If the original macroblock is intra coded, the zero motion vector, the crawl motion vector and intra coding are tested.

After the SADs for the original motion vector, the crawl motion vector, and the zero motion vector are tested, a determination whether all of the SADs for the original motion vector, the crawl motion vector, and the zero motion vector are greater than a predetermined threshold is made, for instance by the motion vector determination module 104. Thereafter, in response to a determination that the SADs for the original motion vector, the crawl motion vector, and the zero motion vector are greater than the predetermined threshold, intra coding is selected as the lowest bit rate coding option.

However, in response to a determination that any of the SADs for the original motion vector, the crawl motion vector, and the zero motion vector are not greater than the predetermined threshold, a lowest bit rate coding option is selected between the original motion vector, the crawl motion vector, and the zero motion vector by choosing the option with the lowest SAD, and inter coding is selected. In this instance, the lowest bit rate coding option is the lowest bit rate motion vector of the original motion vector, the crawl motion vector, and the zero motion vector.

Similarly, in response to a determination of the original macroblock being intra coded, the SADs between the zero motion vector and the crawl motion vector are determined for the macroblock. After the SADs for the zero motion vector and the crawl motion vector are determined, a determination whether all of the SADs for the zero motion vector and the crawl motion vector are greater than a predetermined threshold is made, for instance by the motion vector determination module 104. Thereafter, in response to a determination that all of the SADs for the zero motion vector and the crawl motion vector are greater than the predetermined threshold, intra coding is selected as the lowest bit rate coding option. However, in response to a determination that all of the SADs for the zero motion vector and the crawl motion vector are not greater than the predetermined threshold, a lowest bit rate coding option is selected between inter coding with the crawl motion vector, and inter coding with the zero motion vector.

The lowest bit rate coding option may require that the coding option is to be changed for re-encoding the macroblock. For example, the coding option is to be changed if inter coding with the zero motion vector, or the crawl motion vector, and intra coding each gives a lower SAD result for a macroblock that was originally inter coded with different motion vectors. The coding option may also have to be changed for a macroblock that was originally intra coded if the zero motion vector or crawl motion vector gives a lower SAD result. The coding option may remain the same, for instance, if the macroblock was originally intra coded and the lowest bit rate coding option is intra coding.

The lowest bit rate coding option determined for each macroblock at either step 504 or step 506 hereinabove are thereafter used to re-encode each macroblock as shown at step 412 of the method 400 hereinabove.

Figure 7:
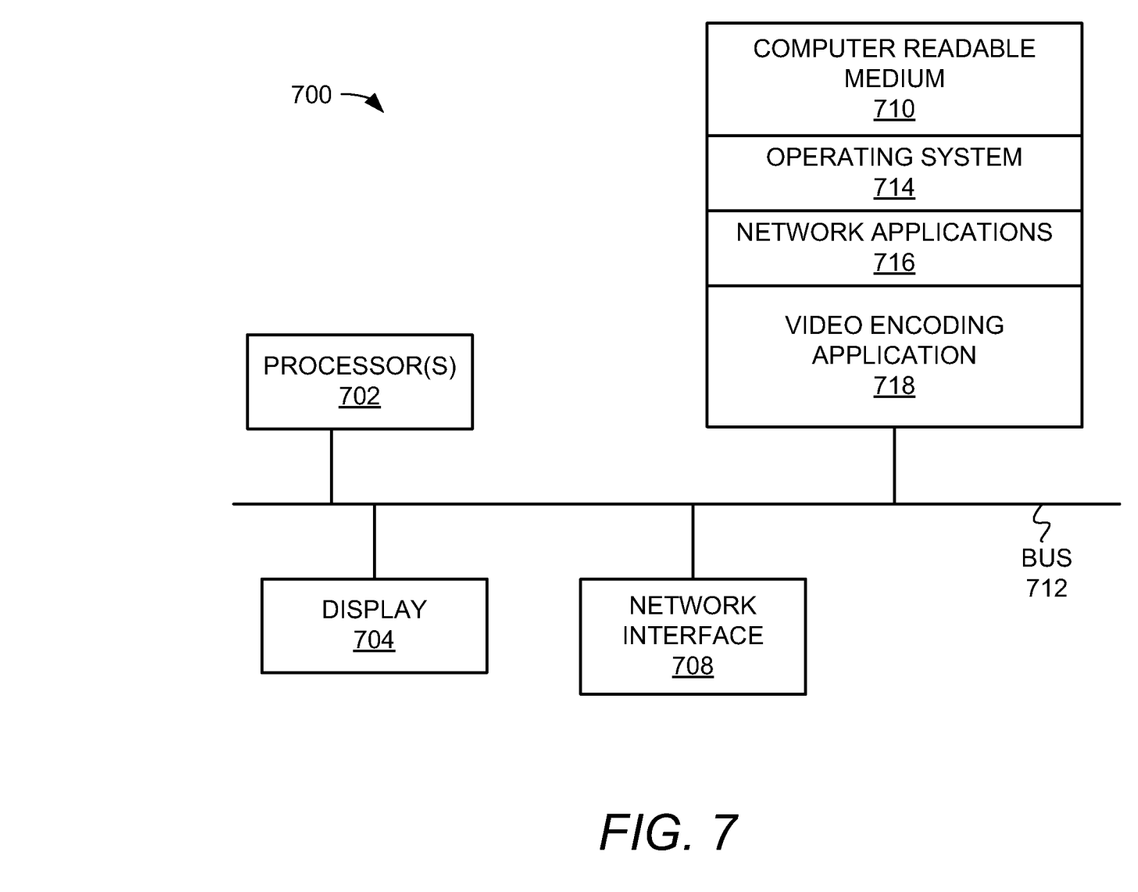
FIG. 7 shows a block diagram of a computer system that may be used for managing bit rate, according to an embodiment of the invention.

Turning now to FIG. 7, there is shown a schematic representation of a computing device 700 configured in accordance with embodiments of the present invention. The computing device 700 includes one or more processors 702, such as a central processing unit; one or more display devices 704, such as a monitor; one or more network interfaces 708, such as a Local Area Network LAN, a wireless 802.11x LAN, a 3G mobile WAN or a WiMax WAN; and one or more computer-readable mediums 710. Each of these components is operatively coupled to one or more buses 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 710 may also store other software applications, including word processors, browsers, email, Instant Messaging, media players, and telephony software.

The computer-readable medium 710 may also store an operating system 714, such as Mac OS, MS Windows, Unix, or Linux; network applications 716; and a video encoding application 718. The operating system 714 may be multi-user, multiprocessing, multitasking, multithreading, real-time and the like. The operating system 714 may also perform basic tasks such as recognizing input from input devices, such as a keyboard or a keypad; sending output to the display 704; keeping track of files and directories on medium 710; controlling peripheral devices, such as disk drives, printers, image capture device; and managing traffic on the one or more buses 712. The network applications 716 include various components for establishing and maintaining network connections, such as software for implementing communication protocols including TCP/IP, HTTP, Ethernet, USB, and FireWire.

The video encoding application 718 provides various software components for operating an encoder, as discussed above. In certain embodiments, some or all of the processes performed by the application 718 may be integrated into the operating system 714. In certain embodiments, the processes can be at least partially implemented in digital electronic circuitry, or in computer hardware, firmware, software, or in any combination thereof, as also discussed above.

Through implementation of the method and apparatus disclosed herein, the number of intra-coded macro-blocks used to encode a bit stream and thereby the number of bits is reduced. Additionally, a lowest bit rate coding option for a motion vector used to encode the bit stream provides a process for decreasing the bit rate for the bit stream while ensuring a relatively high quality picture.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A method for managing bit rate for a video bit stream having a plurality of pictures, the method comprising:
determining whether macroblocks in the plurality of pictures in the video bit stream are to be re-encoded, wherein the macroblocks to be re-encoded include at least one of a macroblock located within a text crawl area or a macroblock having an original motion vector pointing to the text crawl area, wherein the text crawl area is a predetermined area of the plurality of pictures;
determining a crawl motion vector based on crawling text in the text crawl area, the crawling text configured to move with a speed and direction in the text crawl area;
in response to a determination that macroblocks in the plurality of pictures are to be re-encoded determining, by a processor, for each macroblock to be re-encoded:
the bit rate for intra coding using a zero motion vector,
the bit rate for inter coding using the respective macroblock's original motion vector pointing to the text crawl area,
the bit rate for inter coding using a zero motion vector, and
the bit rate for inter coding using the determined crawl motion vector based on the crawling text in the text crawl area; and
comparing the intra coding and inter coding bit rates;
selecting a lowest bit rate coding option selected between the intra coding and the inter coding; and
re-encoding each macroblock using the determined lowest bit rate coding option for the macroblock.

2. The method of claim 1, wherein determining whether the macroblocks in the plurality of pictures are to be re-encoded further comprises:
determining slices of macroblocks in the plurality of pictures substantially likely to include the motion vectors pointing to the text crawl area;
decoding the determined slices; and
determining whether each macroblock in the decoded determined slices has a motion vector pointing to the text crawl area.

3. The method of claim 2, wherein determining slices of macroblocks in the plurality of pictures substantially likely to include the motion vectors pointing to the text crawl area further comprises:
determining a maximum range of motion vectors allowed in each picture of the plurality of pictures; and selecting the slices based on the determined maximum range of motion vectors in each picture.

4. The method of claim 1, further comprising:
determining macroblocks in the plurality of pictures that do not have motion vectors pointing to the text crawl area and are not within the text crawl area; and
sending the macroblocks in the plurality of pictures that do not have motion vectors pointing to the text crawl area and are not within the text crawl area to an output video bit stream in a correct raster scan order.

5. The method of claim 1, wherein determining the lowest bit rate coding option for each macroblock to be re-encoded further comprises:
determining whether each macroblock is within the text crawl area;
in response to a determination that the macroblock is within the text crawl area, determining the lowest bit rate coding option for the macroblock using an original motion vector, a zero motion vector, the crawl motion vector and intra coding; and
in response to a determination that the macroblock is not within the text crawl area, determining the lowest bit rate coding option for the macroblock using an original motion vector, the zero motion vector and intra coding, wherein the original motion vector is a motion vector pointing to the text crawl area.

6. The method of claim 5, wherein determining the lowest bit rate coding option for the macroblock using the original motion vector, the zero motion vector, and the crawl motion vector in response to the determination that the macroblock is within the text crawl area further comprises:
determining whether the macroblock is intra-coded or inter-coded;
in response to the macroblock being inter coded, determining a sum of absolute differences (SAD) for each of the original motion vector, the zero motion vector, and the crawl motion vector,
determining whether the determined SADs for each of the original motion vector, the zero motion vector, and the crawl motion vector are greater than a predetermined threshold, and
in response to a determination that the determined SADs for each of the original motion vector, the zero motion vector, and the crawl motion vector are greater than a predetermined threshold, selecting intra coding as the lowest bit rate coding option,
in response to a determination that the determined SADs for each of the original motion vector, the zero motion vector, and the crawl motion vector are not greater than a predetermined threshold, selecting inter coding with a lowest bit rate motion vector of the motion vector pointing to the text crawl area, the zero motion vector and the crawl motion vector as the lowest bit rate coding option;
in response to the original macroblock being intra coded, determining a SAD for each of the zero motion vector, and the crawl motion vector;
determining whether the determined SADs for each of the zero motion vector, and the crawl motion vector are greater than a predetermined threshold, and
in response to a determination that the determined SADs for each of the zero motion vector, and the crawl motion vector are greater than a predetermined threshold, selecting intra coding as the lowest bit rate coding option,
in response to a determination that the determined SADs for each of the zero motion vector, and the crawl motion vector are not greater than a predetermined threshold, selecting inter coding with a lowest bit rate motion vector of the zero motion vector and the crawl motion vector as the lowest bit rate coding option.

7. The method of claim 5, wherein determining the lowest bit rate coding option for each macroblock using the original motion vector, and the zero motion vector in response to a determination that the macroblock is not within the text crawl area further comprises:
determining whether the macroblock is intra-coded or inter-coded;
in response to the macroblock being inter coded, determining a SAD for each of the original motion vector and the zero motion vector,
determining whether the determined SADs for each of the motion vector pointing to the text crawl area, and the zero motion vector are greater than a predetermined threshold, and
in response to a determination that the determined SADs for each of the original motion vector, and the zero motion vector are greater than a predetermined threshold, selecting intra coding as the lowest bit rate coding option,
in response to a determination that the determined SADs for each of the original motion vector, and the zero motion vector are not greater than a predetermined threshold, selecting inter coding using a lowest bit rate motion vector of the original motion vector, and the zero motion vector as the lowest bit rate coding option;
in response to the macroblock being intra coded, determining a SAD of the zero motion vector;
determining whether the determined SAD for the zero motion vector is greater than the predetermined threshold, and
in response to a determination that the determined SAD for the zero motion vector is greater than a predetermined threshold, selecting intra coding as the lowest bit rate coding option,
in response to a determination that the determined SAD for the zero motion vector is not greater than a predetermined threshold, selecting inter coding using the zero motion vector as the lowest bit rate coding option.

8. The method of claim 1, wherein determining the lowest bit rate coding option for each macroblock to be re-encoded further comprises:
marking the macroblocks to be re-encoded with a flag, wherein the flag indicates that the macroblocks are to be re-encoded.

9. The method of claim 1, wherein re-encoding each macroblock using the lowest bit rate coding option for the macroblock comprises inserting the re-encoded macroblocks in a correct raster scan order into the plurality of pictures.

10. The method of claim 1, wherein the direction of the crawling text is one of left to right, right to left, bottom to top, and top to bottom.

11. The method of claim 1, wherein the text crawl area comprises a background and the text crawl area is aligned in one of a horizontal and a vertical portion of the plurality of pictures.

12. An apparatus for managing bit rate for a video bit stream having a plurality of pictures, the apparatus comprising:
one or more modules configured to:
determine whether to re-encode macroblocks in the plurality of pictures in the video bit stream, wherein the macroblocks to be re-encoded include at least one of a macroblock located within a text crawl area or a macroblock having an original motion vector pointing to the text crawl area, wherein the text crawl area is a predetermined area of the plurality of pictures, determine a crawl motion vector based on crawling text in the text crawl area, the crawling text configured to move with a speed and direction in the text crawl area, in response to a determination that macroblocks in the plurality of pictures are to be re-encoded, determining, by a processor, for each macroblock to be re-encoded:
the bit rate for intra coding using a zero motion vector,
the bit rate for inter coding using the respective macroblock's original motion vector pointing to the text crawl area,
the bit rate for inter coding using a zero motion vector, and
the bit rate for inter coding using the determined crawl motion vector based on the crawling text in the text crawl area; and compare the intra coding and inter coding bit rates;

select a lowest bit rate coding option selected between the intra coding and the inter coding; and re-encode each macroblock using the determined lowest bit rate coding option for the macroblock; and a processor configured to implement the one or more modules.

13. The apparatus of claim 12, wherein, to determine whether the macroblocks in the plurality of pictures are to be re-encoded, the one or more modules are further configured to determine slices of macroblocks in the plurality of pictures substantially likely to include the motion vectors pointing to the text crawl area, decode the determined slices, and determine whether each macroblock in the decoded determined slices has a motion vector pointing to the text crawl area.

14. The apparatus of claim 13, wherein, to determine slices of macroblocks in the plurality of pictures substantially likely to include motion vectors pointing to the text crawl area, the one or more modules are further configured to determine a maximum range of motion vectors allowed in each picture of the plurality of pictures and select slices of macroblocks based on the determined maximum range of motion vectors in each picture.

15. The apparatus of claim 12, wherein the one or more modules are further configured to determine macroblocks in the plurality of pictures that do not have motion vectors pointing to the text crawl area and are not within the text crawl area and to send the macroblocks in the plurality of pictures that do not have motion vectors pointing to the text crawl area and are not within the text crawl area to an output video bit stream in a correct raster scan order.

16. The apparatus of claim 12, wherein, to determine the lowest bit rate coding option for each macroblock, to be re-encoded, the one or more modules are further configured to determine whether each macroblock is within the text crawl area, determine the lowest bit rate coding option for the macroblock using an original motion vector, a zero motion vector, the crawl motion vector, and intra coding, in response to a determination that the macroblock is within the text crawl area, and to determine the lowest bit rate coding option for the macroblock using an original motion vector, the zero motion vector, and intra coding, wherein the original motion vector is a motion vector pointing to the text crawl area, in response to a determination that a macroblock is not within the text crawl area.

17. The apparatus of claim 12, wherein, to determine the lowest bit rate coding option for each macroblock to be re-encoded, the one or more modules are further configured to mark the macroblocks to be re-encoded with a flag, wherein the flag indicates that the macroblocks are to be re-encoded.

18. A non-transitory computer readable storage medium storing at least one computer program that when executed by a computer performs a method for managing bit rate for a bit stream having a plurality of pictures, the method comprising:
determining whether to re-encode macroblocks in the plurality of pictures in the video bit stream, wherein the macroblocks to be re-encoded include at least one of a macroblock located within a text crawl area or a macroblock having an original motion vector pointing to the text crawl area, wherein the text crawl area is a predetermined area of the plurality of pictures;

determining a crawl motion vector based on crawling text in the text crawl area, the crawling text configured to move with a speed and direction in the text crawl area;

in response to a determination that macroblocks in the plurality of pictures are to be re-encoded, determining, by a processor, for each macroblock to be re-encoded:
the bit rate for intra coding using a zero motion vector,
the bit rate for inter coding using the respective macroblock's original motion vector pointing to the text crawl area,
the bit rate for inter coding using a zero motion vector, and
the bit rate for inter coding using the determined crawl motion vector based on the crawling text in the text crawl area; and comparing the intra coding and inter coding bit rates;

selecting a lowest bit rate coding option selected between the intra coding and the inter coding; and re-encoding each macroblock using the determined lowest bit rate coding option for the macroblock.

* * * * *